United States Patent [19]
Okuchi et al.

[11] Patent Number: 5,697,690
[45] Date of Patent: Dec. 16, 1997

[54] ILLUMINATING DEVICE FOR VEHICLES

[75] Inventors: Hiroaki Okuchi, Anjo; Hideyuki Kato, Nishio; Kazumi Hayashi, Okazaki, all of Japan

[73] Assignee: Nippondenso, Ltd., Japan

[21] Appl. No.: 504,548

[22] Filed: Jul. 20, 1995

[30] Foreign Application Priority Data

Jul. 21, 1994 [JP] Japan .................. 6-169796

[51] Int. Cl.$^6$ .................. B60Q 1/04; F21V 8/00
[52] U.S. Cl. .................. 362/32; 362/61
[58] Field of Search .................. 362/132, 61, 80; 385/31, 33, 35, 39

[56] References Cited

U.S. PATENT DOCUMENTS 5,257,168 10/1993 Davenport et al. .

FOREIGN PATENT DOCUMENTS 623780 11/1994 European Pat. Off. .
6-68702 3/1994 Japan .

*Primary Examiner*—Y My Quach
*Attorney, Agent, or Firm*—Cushman Darby & Cushman Intellectual Property Group of Pillsbury, Madison & Sutro, LLP

[57] ABSTRACT

In an illuminating device for vehicles in which a light conductor made of light transmissive material having a predetermined light refractive index is placed between an outgoing light end of an optical cable and an incident light end of a lens body. The light conductor is shaped so as to cover the whole surface of the outgoing light end of the optical cable practically as well as to have an outgoing light surface shaped suitable for defining an illumination pattern. The lens body has the incident light end shaped to cover satisfactorily the outgoing light surface of the light conductor. Thus, the luminous flux from the outgoing light surface is emitted forward based on its shape as luminous flux of the desired light distribution without the waste of the luminous flux.

11 Claims, 3 Drawing Sheets

ILLUMINATING DEVICE FOR VEHICLES

CROSS REFERENCE TO RELATED APPLICATION

This application is based upon and claims priority of Japanese Patent Application No. 6-169796 filed on Jul. 21, 1994, the contest of which is incorporated herein by reference.

BACKGROUND OF THE INVENTION

1. Field of the Invention

The present invention relates to an illuminating device for vehicles such as a headlamp of vehicles which emits light toward a desired area of the plane to be lit by distributing luminous flux with a predetermined shape.

2. Description of Related Art

There has been a headlamp for vehicles utilizing a discharge lamp as a light source and a control circuit for the discharge lamp is combined with the lamp in view of power efficiency relative to the lighting intensity. In this kind of headlamp, the discharge lamp is placed in one place within a vehicle as a condensed light source, and from there luminous flux or light flux is guided to the positions of right and left headlamps located in the front part of vehicle via an optical cable, because the control circuit costs expensive. Therefore, at the right and left ends of the front part of vehicle, when an outgoing light from the optical cable is conducted forward via a lens body, the illuminated area out of the predetermined area is cut by a shade plate at the point where the light is coming into the lens body from the optical cable to illuminate the desired area only, in order to prevent glaring toward on-coming vehicles running on the opposite lane or a preceding vehicle running on the same lane. An invention disclosed in Japanese Patent Application Laid-open No. 6-68702 by the same applicant is one of such examples. A structure of this conventional headlamp is shown in FIG. 7, where a shade plate 7 is placed between the outgoing light end of the optical cable 1 and the incident light ends of lens bodies 3 and 4 so that the luminous flux is limited to a cross-sectional shape suitable for defining the light distribution shape to be lit forward.

However, almost ⅓ of the total luminous flux is wasted by the above luminous flux cutting system using the shade plate and it is a considerable loss of the luminous flux.

SUMMARY OF THE INVENTION

It is an object of the present invention to provide an illuminating device for vehicles with an improved energy efficiency of a light source.

It is a further object of the present invention to provide an illuminating device in which an outgoing light from an optical cable to be lit forward via lens body is distributed with a predetermined brightness without wasting the luminous flux.

According to the present invention, a light conductor made of light transmissive material which has a predetermined light refractive index is located between an outgoing light end of an optical cable and an incident light end of a lens body. The light conductor has an incident light surface covering substantially the whole outgoing light end of the optical cable as well as has an outgoing light surface suitable for defining the light distributing shape. The lens body has an incident light end including the outgoing light surface of the light conductor satisfactorily and the lens body is also shaped so that the luminous flux from the outgoing light surface of the light conductor can be lit forward with a desired light distribution pattern.

According to this arrangement, all the luminous flux from the optical cable enters into the light conductor and the lens body to be emitted forward from the latter. Additionally, the area to be lit will be coincidental with the desired area determined by the shape of outgoing light surface of the light conductor and a functioning of the lens body.

BRIEF DESCRIPTION OF THE DRAWINGS

Other objects, features, and characteristics of the present invention as well as the functions of related parts of the present invention will become clear from a study of the following detailed description, the appended claims and the drawings. In the accompanying drawings:

DETAILED DESCRIPTION OF PREFERRED EMBODIMENTS

Referring to figures, embodiments according to the present invention are described hereinafter.

Figure 1:
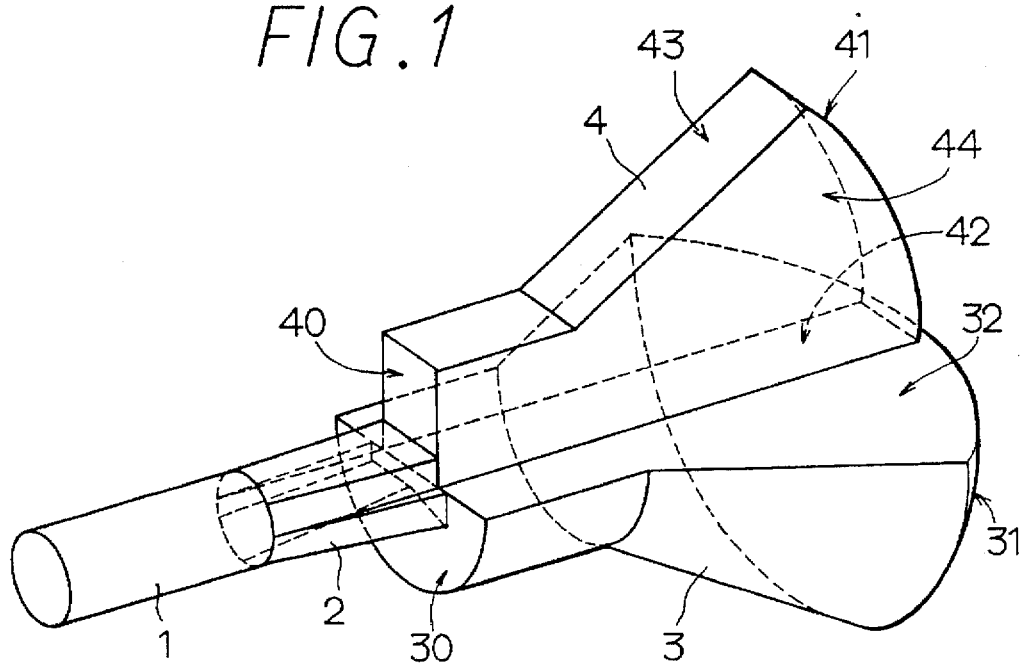
FIG. 1 is a perspective view of a first embodiment of an illuminating device for vehicles according to the present invention.

FIG. 1 is a perspective view showing a first embodiment of the present invention. Reference numerals 1, 2, 3 and 4 designate, respectively, an optical cable, a light conductor which will be described in detail hereinbelow, a first lens body for condensed luminous flux and a second lens body for flat-dispersive luminous flux.

Figure 2:
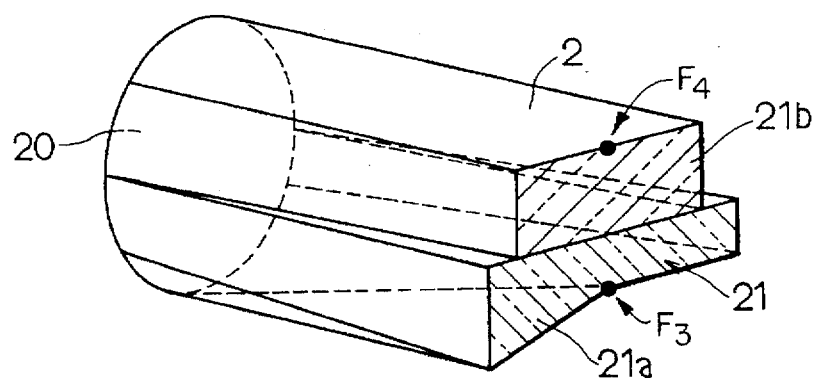
FIG. 2 is a perspective view of one form of a light conductor in the first embodiment.

Light conductor 2 is shaped into a circle, as shown in FIG. 2, and has an incident light surface 20 which covers the whole surface of the outgoing light end of optical cable 1. Therefore, the shape of incident light surface 20 is a circle with a same radius as or with a slightly larger radius than the outgoing light end of optical cable 1. Light conductor 2 also has an outgoing light surface 21 suitable for defining the light distribution of the illumination. With regard to its material, a high light transmissive material, such as acrylic resin having a predetermined light refractive index relative to the surrounding air in order to guide the light therethrough, is utilized. Between incident light surface 20 and outgoing light surface 21, the outside surface of the conductor 2 is smoothly shaped. All the luminous flux emitting from optical cable 1 enters into light conductor 2 and is guided to outgoing light surface 21 either passing straight or being reflected inside the light conductor. Therefore, at outgoing light surface 21, enough quantity of light for a practical use is obtained and the shape of luminous flux results in a shape similar to the cross-section of outgoing light surface 21. In this case, if the length of light conductor 2 is too short, the light at the vicinity of the center of outgoing light surface 21 becomes bright and the light at the vicinity of corners becomes dark in its light distribution. However, in such a case that the diameter of incident light surface 20 is around 10 mm and the length of light conductor 2 is between 30 mm and 50 mm, enough quantity of light is obtained even at the corners of outgoing light surface 21. In the figures, the lower half part 21a of outgoing light surface 21 contacts a light incoming end 30 of the first lens body 3 which is described later and this part transmits luminous flux for condensed luminous flux. On the other hand, an upper half part 21b of light outgoing surface 21 contacts incident light end 40 of the second lens body 4 which is also described later and this part transmits luminous flux for flat-dispersive luminous flux.

In the embodiment shown in FIG. 1, two lens bodies each of which has different lens function are combined so that a combination of two kinds of light distribution is realized. First lens body 3 is substantially conically shaped spread from incident light end 30 to outgoing light surface 31 and is formed with outgoing light surface 31 which is substantially spherical. To be more precise, the shape is slightly aspherical to adjust an aberration. This spherical shape has a focal point $F_3$ thereof within the object in the vicinity of incident light end 30. In this embodiment, it is a half of the conical shape cut along the plane 32 which passes the vicinity of a center axis of the conical shape. In second lens body 4, both horizontal directional sides of lens body 4 are formed into substantially vertical planes 43 and 44 opposing to each other. Light outgoing surface 41 is substantially arc shaped. To be precise, it is slightly non-arc shape to adjust an aberration. It has a focal point $F_4$ thereof within the object in the vicinity of incident light end 40 and is formed generally into a cylindrical plane which is horizontally straight. In this embodiment, it is a half of the shape cut along a plane surface 42 which passes through the vicinity of a center axis of the cylindrical shape. First lens body 3 and second lens body 4 are combined with cut surfaces 32 and 42 contacting each other.

Figure 3:
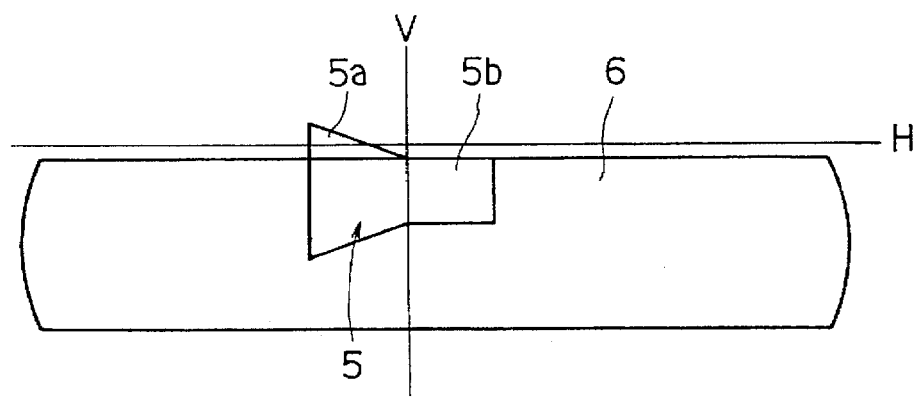
FIG. 3 is a schematic view showing a light distribution pattern according to the first embodiment.

Cut surfaces 32 and 42 become a total reflective surfaces of the luminous flux from incident light ends 30 and 40, respectively. Therefore, each becomes luminous flux shaped as if shape 21a is added on the upper side symmetrically as well as shape 21b is added on the lower side symmetrically. Thus, the luminous flux in the combined shape is emitted forward via first lens body 3 and second lens body 4. Since the first lens body 3 is a normal omnidirectional lens body, the luminous flux of symmetrically-added shape (21a) forms an illuminating area which is enlarged into an inverted shape. Since the second lens body 4 works as lens only in a vertical direction, the luminous flux of symmetrically-added shape (21b) is enlarged only in the vertical direction. In a horizontal direction, it becomes free dispersive emission of the luminous flux passing between vertical surfaces 43 and 44, and the illuminating area which is converged only in vertical direction but flat in horizontal direction is formed. As a result, the front illuminated area becomes, as is shown in FIG. 3, a condensed illuminating area 5 (hot zone) and dispersive illuminating area 6 against horizontal line H and vertical center line V. This light distribution pattern is used in the low beam mode of a vehicle. The enlarged upper left part 5a of condensed illuminating area 5 is for recognizing pedestrians. The enlarged lower left part 5a of the same is formed, because it becomes symmetrical by mirror reflection. The entirety of light outgoing surface 21 of the light conductor 2 coincides with the plane vertical to an optical axis passing through focal points of light outgoing surfaces 31 and 41 of the lenses 3 and 4. Further, the entirety of light incoming surface of the light conductor 2 covers the whole surface of the light outgoing surface of the optical cable 1. Thus the luminous flux is not wasted, and the condensed illumination area and dispersive illumination area which are in contrasting brightness to each other can be obtained.

Figure 4:
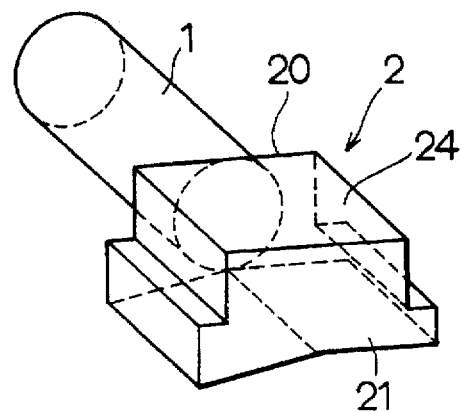
FIG. 4 is a perspective view of another form of the light conductor in the first embodiment.

In the embodiment shown in FIG. 2, the outer circumferential surface of light conductor 2 is shaped to be a free-curved surface changing its shape from circular to transformed-angular. Therefore, it may become difficult to manufacture a mold for such light conductor. In this case, as is shown in FIG. 4, it is also possible to modify the light conductor 2 into a solid with a fixed cross-section 20 having the same shape as the light outgoing surface 21 which contacts the lens bodies 3 and 4. By allowing enough length for the light conductor 2, practically sufficient light quantity is obtained even at the corners in the light distribution of light outgoing surface 21.

Figure 5A:
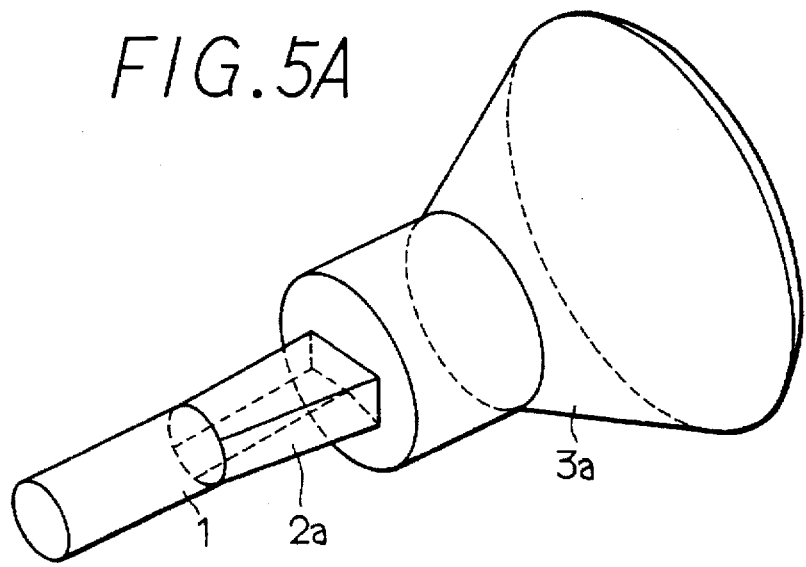
FIGS. 5A and 5B are perspective views of a second embodiment of the illuminating device for vehicles according to the present invention.
Figure 5B:
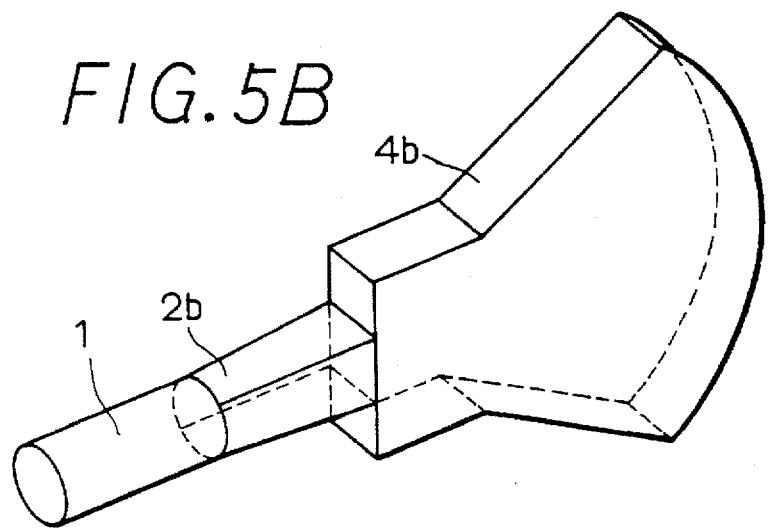

Still further, as a second embodiment, instead of combining halves of first lens body 3 and second lens body 4, these lenses can be utilized independently as first lens body 3a and second lens body 4b shown in FIGS. 5A and 5B, respectively. In this case, light conductor 2 needs to consist separately of light conductor 2a for condensed illumination and light conductor 2b for flat-dispersive illumination each having a suitable shape of light distributing surface. It is also possible to use only one combination of light conductor 2a with lens body 3a or light conductor 2b with lens body 4b, depending on a required light distributing pattern.

Figure 6:
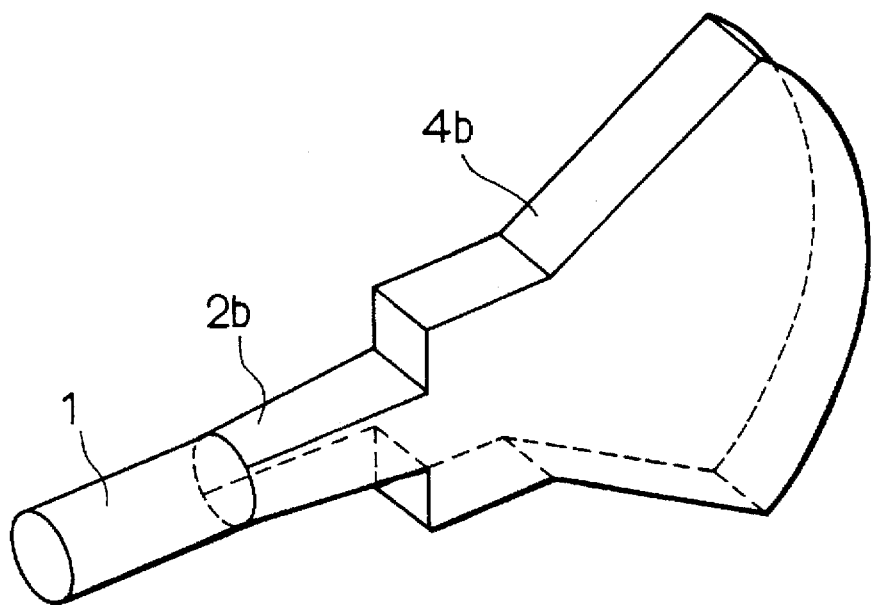
FIG. 6 is a perspective view showing a third embodiment of the illuminating device for vehicles according to the present invention.
Figure 7:
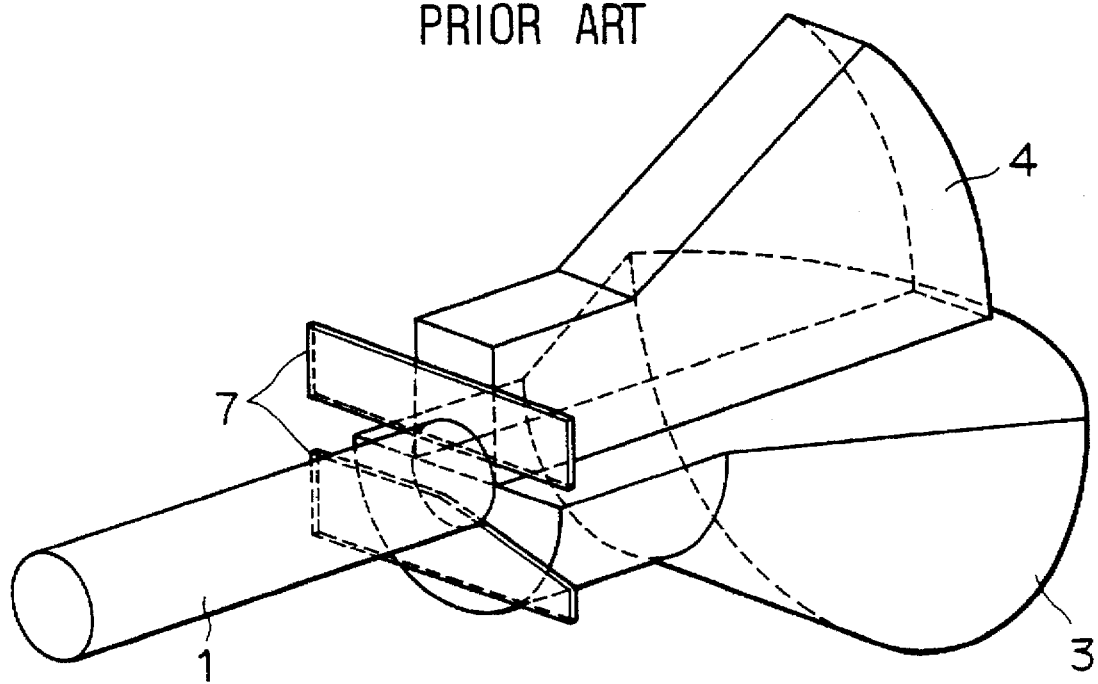
FIG. 7 is a perspective view of a prior art of the illuminating device for vehicles.

As is shown in FIG. 6 as a third embodiment, light conductor 2b and lens body 4b can be formed integrally so that the number of parts required is reduced and the manufacturing can be simplified. In the same manner, lens body 3a and light conductor 2a may be formed integrally.

In the foregoing embodiments, the illuminating device may be manufactured by adhering fixedly the optical cable with light conductor and detachably combining optical conductor with lens body, or detachably combining optical cable with light conductor and fixedly adhering optical conductor with lens body. In either case, the optical cable can be exchanged with the lens body being fixed to a vehicle.

According to the present invention, the luminous flux guided by the optical cable can be emitted forward in a desired shape based on the outgoing light surface of the light conductor, without losing a part of the luminous flux but using the whole luminous flux. Therefore, the utilization efficiency of the light from the light source can be improved.

What is claimed is:

1. An illuminating device for vehicles in which an outgoing light from an optical cable is emitted forward through a lens body, said device comprising:

a light conductor made of light transmissive material with a predetermined refractive index and located between an outgoing light end of said optical cable and an incident light end of said lens body, said light conductor having an incident light surface shaped to cover wholly the outgoing light end of said optical cable and having an outgoing light surface shaped to define a light distributing shape;

said incident light end of said lens body being shaped to cover sufficiently the outgoing light surface of said light conductor and emitting a luminous flux from said outgoing light surface forward as luminous flux of desired light distribution based on a shape of said outgoing light surface of said light conductor; and said outgoing light surface of said light conductor formed perpendicularly to an optical axis of said lens body, said optical axis passing through, wherein said lens body comprises:

a first lens body emitting condensed luminous flux forward from an outgoing light surface thereof; and a second lens body emitting, from an outgoing light surface thereof, luminous flux as dispersive luminous flux which is dispersive to a wide angle in horizontal direction and condensed to a narrow angle in vertical direction.

2. An illuminating device for vehicles according to claim 1, wherein a first half of said outgoing light surface of said light conductor is shaped for defining a condensed luminous flux distribution shape and connected with the incident light end of said first lens body and a second half of said outgoing light surface of said light conductor is shaped for defining a dispersive luminous flux distribution shape and connected with the incident light end of said second lens body.

3. An illuminating device for vehicles according to claim 2, wherein:

said first lens body is substantially conically shaped spreading from the incident light end thereof to the outgoing light surface thereof and the outgoing light surface thereof is shaped spherically to have a focal point in vicinity of the incident light end of said first lens body; and said outgoing light surface of said second lens body is arc shaped having a focal point in a vicinity of the incident light end of said second lens body and is formed generally into a cylindrical plane which is horizontally straight.

4. An illuminating device for vehicles according to claim 3, wherein:

said first lens body is a half of frustoconical body cut along a plane passing through a vicinity of a central axis of said frustoconical body;

said second lens body is a half of a cylindrical body cut along a plane passing through a vicinity of a central axis of said cylindrical body; and each cut surface of said first lens body and said second lens body are facing each other.

5. An illuminating device for vehicles in which an outgoing light from an optical cable emitted forward through a lens body, said device comprising:

a light conductor made of light transmissive material with a predetermined refractive index and located between an outgoing light end of said optical cable and an incident light end of said lens body, said light conductor having an incident light surface shaped to cover wholly the outgoing light end of said optical cable and having an outgoing light surface shaped to define a light distributing shape;

said incident light end of said lens body being shaped to cover sufficiently the outgoing light surface of said light conductor and emitting a luminous flux from said outgoing light surface forward as luminous flux of desired light distribution based on a shape of said outgoing light surface of said light conductor; and said outgoing light surface of said light conductor formed perpendicularly to an optical axis of said lens body, said optical axis passing through focal points of said lens body, and said light conductor and said lens body are formed integrally as a single unit.

6. An illuminating device for vehicles comprising:

an optical cable for transmitting a light incident thereon;

a light conductor having a light incident surface and a light outgoing surface, and said light incident surface being connected to and covering an end surface of said optical cable; and a lens body having a light incident surface and a light outgoing surface, said light incident surface of said lens body being connected to said light outgoing surface of said light conductor, wherein:

said light incident surface of said lens body fully covers said light outgoing surface of said light conductor, and said light outgoing surface of said light conductor coincides with a plane vertical to an optical axis of said lens body, said optical axis passes through focal points of said lens body.

7. An illuminating device according to claim 6, wherein said light conductor and said lens body are formed integrally.

8. An illuminating device, for vehicles comprising:

an optical cable for transmitting a light incident thereon;

a light conductor having a light incident surface and a light outgoing surface, and said light incident surface being connected to and covering an end surface of said optical cable; and a lens body having a light incident surface and a light outgoing surface, said light incident surface of said lens body being connected to said light outgoing surface of said light conductor, wherein:

said light incident surface of said lens body fully covers said light outgoing surface of said light conductor, and said light outgoing surface of said light conductor coincides with a plane vertical to an optical axis of said lens body, said optical axis passes through focal points of said lens body coincides with a plane vertical to an optical axis of said lens body, said optical axis wherein said light outgoing surface of said light conductor includes:

a first surface shaped in a first rectangular form; and a second surface shaped in a combination of a second rectangular form and a substantially triangle form.

9. An illuminating device according to claim 8, wherein said lens body includes:

a first lens connected to said second surface for providing a condensed illumination pattern; and a second lens connected to said first surface for providing dispersive illumination pattern.

10. An illuminating device for vehicles in which an outgoing light from an optical cable is emitted forward through a lens body, said device comprising:

a light conductor made of light transmissive material with a predetermined refractive index and located between an outgoing light end of said optical cable and a light incident end of said lens body, said light conductor having an incident light surface shaped to cover wholly the outgoing light end of said optical cable and having an outgoing light surface shaped to define a light distributing shape;

said incident light end of said lens body being shaped to cover sufficiently the outgoing light surface of said light conductor and emitting a luminous flux from said outgoing light surface forward as luminous flux of desired light distribution based on a shape of said outgoing light surface of said light conductor; and wherein said lens body comprises:

a first lens body emitting condensed luminous flux forward from an outgoing light surface thereof; and a second lens body emitting, from an outgoing light surface thereof, luminous flux as dispersive luminous flux which is dispersive to a wide angle in horizontal direction and condensed to a narrow angle in vertical direction.

11. An illuminating device for vehicles in which an outgoing light from an optical cable is emitted forward through a lens body, said device comprising:

a light conductor made of light transmissive material with a predetermined refractive index and located between an outgoing light end of said optical cable and a light incident end of said lens body, said light conductor having an incident light surface shaped to cover wholly the outgoing light end of said optical cable and having an outgoing light surface shaped to define a light distributing shape;

said incident light end of said lens body being shaped to cover sufficiently the outgoing light surface of said light conductor and emitting a luminous flux from said outgoing light surface forward as luminous flux of desired light distribution to an outgoing light surface of said lens body based on a shape of said outgoing light surface of said light conductor a central part of said outgoing light surface of said light conductor positioned between focal points of said lens body; and said light conductor and said lens body are formed integrally as a single unit.

* * * * *